(12) United States Patent
Solazzi

(10) Patent No.: US 10,761,012 B1
(45) Date of Patent: Sep. 1, 2020

(54) COMPUTER-IMPLEMENTED METHOD OF THIN-FILM SELECTION FOR SPECTROSCOPY

(71) Applicant: Michael C. Solazzi, Palm City, FL (US)

(72) Inventor: Michael C. Solazzi, Palm City, FL (US)

( * ) Notice: Subject to any disclaimer, the term of this patent is extended or adjusted under 35 U.S.C. 154(b) by 316 days.

(21) Appl. No.: 15/996,615

(22) Filed: Jun. 4, 2018

Related U.S. Application Data

(60) Provisional application No. 62/515,158, filed on Jun. 5, 2017.

(51) Int. Cl.
*G06Q 30/00* (2012.01)
*G01N 21/01* (2006.01)
*G01N 21/25* (2006.01)

(52) U.S. Cl.
CPC ........... *G01N 21/01* (2013.01); *G01N 21/255* (2013.01); *G01N 2021/0175* (2013.01)

(58) Field of Classification Search
None
See application file for complete search history.

(56) References Cited

U.S. PATENT DOCUMENTS

2002/0048531 A1* 4/2002 Fonash ................ B81C 1/0038
422/68.1

\* cited by examiner

*Primary Examiner* — Mila Airapetian
(74) *Attorney, Agent, or Firm* — Keene IP Law, LLC

(57) ABSTRACT

Computer-implemented methods and computer-readable media are disclosed for providing a spectroscopic film selection tool to select one or more of a plurality of films for use in a spectroscopic analysis. At a first computing system, a spectroscopic film selection tool is stored in a non-transitory storage medium. The spectroscopic film selection tool includes a set of machine-readable instructions configured to execute on a second computing system. The machine-readable instructions are configured to elicit user input regarding attributes of a spectroscopic analysis and, based on the user input, identify one or more of a plurality of films for use in a spectroscopic analysis based on film data for each of the plurality of films. The film selection tool also includes a store of the film data for each of the plurality of films including data relating to suitability of each of the plurality of films including a film type, a film thickness, a chemical resistance to one or more types of chemicals, and energy transmittance properties. The first computing system is communicatively coupled with a network from which the second computing system is able to download the spectroscopic film selection tool. Following the download of the spectroscopic film selection tool at the second computing system, a user of the second computing system is able to execute the spectroscopic film selection tool on the second computing system.

20 Claims, 14 Drawing Sheets

| Type | Acid Conc. Weak | Acid Conc. | Alcohol Aliphatic | Aldehydes | Alkalies Conc. | Esters | Ethers | Hydrocarbon Aliphatic | Hydrocarbon Aromatic | Hydrocarbon Halogenated | Ketones | Oxidizing Agents |
|---|---|---|---|---|---|---|---|---|---|---|---|---|
| Zythene® | Good | Good | Good | Fair | Good | Fair | Fair | Excellent | Excellent | No Rec. | Good | Fair |
| Kapton® | Good | Good | Good | Fair | Good | Fair | Unknown | Excellent | Excellent | No Rec. | Good | Fair |
| Mylar® | No Rec. | No Rec. | No Rec. | Excellent | Excellent | No Rec. | Fair | Excellent | No Rec. | Fair | No Rec. | No Rec. |
| Prolene® | Good | Excellent | Excellent | Unknown | No Rec. | Good | No Rec. | Good | No Rec. | No Rec. | Good | Fair |
| Polypropylene | Excellent | Excellent | Excellent | Excellent | Excellent | Good | No Rec. | Excellent | No Rec. | No Rec. | Good | Fair |
| Polycarbonate | Good | Good | Good | Fair | No Rec. | No Rec. | No Rec. | No Rec. | No Rec. | No Rec. | No Rec. | No Rec. |
| UltraPolyester® | Good | Good | No Rec. | Unknown | No Rec. | No Rec. | Fair | Good | No Rec. | Fair | No Rec. | Fair |

Etnom®
This is the first thin-film substance to chemically resist attack by aliphatic and especially aromatic hydrocarbons and have the unique characteristic of contracting when exposed to petrochemical hydrocarbons. This unique characteristic allows the thin-film to remain taut when exposed to samples containing these hydrocarbons and maintain a consistent taut flat sample support window plane during the entire integration time of analysis. Etnom® is frequently used and ideally suitable for sulfur analysis in aliphatic and particularly aromatic hydrocarbons.

Zythene®
Zythene® is another thin-film that is chemically resistant to petrochemicals and, unlike any other thin-film, is also capable to contract upon contact with aliphatic and aromatic hydrocarbons. This particular trait is responsible for establishing and maintaining taut sample support window planes during the entire integration time of analysis. Adding this unique quality to the unusually high sample retention tensile strength of Zythene®, samples are safely contained in their sample cups with a rare likelihood of rupture.

UltraPolyester®
This thin-film has properties that are similar to those of Mylar® except that it is extremely thin with excellent transmittance properties.

Prolene®
This thin-film is a two-constituent element combination of carbon and hydrogen. The light carbon and hydrogen element constituents together with gauge thickness translate into mass attenuation coefficients providing high % Transmittance values, an advantage for investigating the less energetic (keV) analyte spectral lines in low element concentrations. Prolene® represents a good general

FIG. 4

| Type | Acid Weak | Acid Conc. | Alcohol Aliphatic | Aldehydes | Alkalies Conc. | Esters | Ethers | Hydrocarbon Aliphatic | Hydrocarbon Aromatic | Hydrocarbon Halogenated | Ketones | Oxidizing Agents |
|---|---|---|---|---|---|---|---|---|---|---|---|---|
| Etnom® | Good | Good | Good | Fair | Good | Fair | Fair | Excellent | Excellent | No Rec. | Good | Fair |
| Zythene® | Good | Good | Good | Fair | Good | Fair | Fair | Excellent | Excellent | No Rec. | Good | Fair |
| Mylar® | Good | Good | No Rec. | Unknown | No Rec. | No Rec. | Fair | Good | No Rec. | Fair | No Rec. | Fair |
| Prolene® | Good | Excellent | Excellent | Excellent | Excellent | Good | No Rec | Good | No Rec. | No Rec. | Good | Fair |
| Polycarbonate | Good | Good | Good | Fair | No Rec. | No Rec. | No Rec | No Rec. | No Rec. | No Rec. | No Rec. | No Rec. |
| UltraPolyester® | Good | Good | No Rec. | Unknown | No Rec. | No Rec. | Fair | Good | No Rec. | Fair | No Rec. | Fair |

Etnom®
This is the first thin-film substance to chemically resist attack by aliphatic and especially aromatic hydrocarbons and have the unique characteristic of contracting when exposed to petrochemical hydrocarbons. This unique characteristic allows the thin-film to remain taut when exposed to samples containing these hydrocarbons and maintain a consistent taut flat sample support window plane during the entire integration time of analysis. Etnom® is frequently used and ideally suitable for sulfur analysis in aliphatic and particularly aromatic hydrocarbons.

Zythene®
Zythene® is another thin-film that is chemically resistant to petrochemicals and, unlike any other thin-film, is also capable to contract upon contact with aliphatic and aromatic hydrocarbons. This particular trait is responsible for establishing and maintaining taut sample support window planes during the entire integration time of analysis. Adding this unique quality to the unusually high sample retention tensile strength of Zythene®, samples are safely contained in their sample cups with a rare likelihood of rupture.

UltraPolyester®
This thin-film has properties that are similar to those of Mylar® except that it is extremely thin with excellent transmittance properties.

Prolene®
This thin-film is a two-constituent element combination of carbon and hydrogen. The light carbon and hydrogen element constituents together with gauge thickness translate into mass attenuation coefficients providing high % Transmittance values, an advantage for investigating the less energetic (KeV) analyte spectral lines in low element concentrations. Prolene® represents a good general

FIG. 5

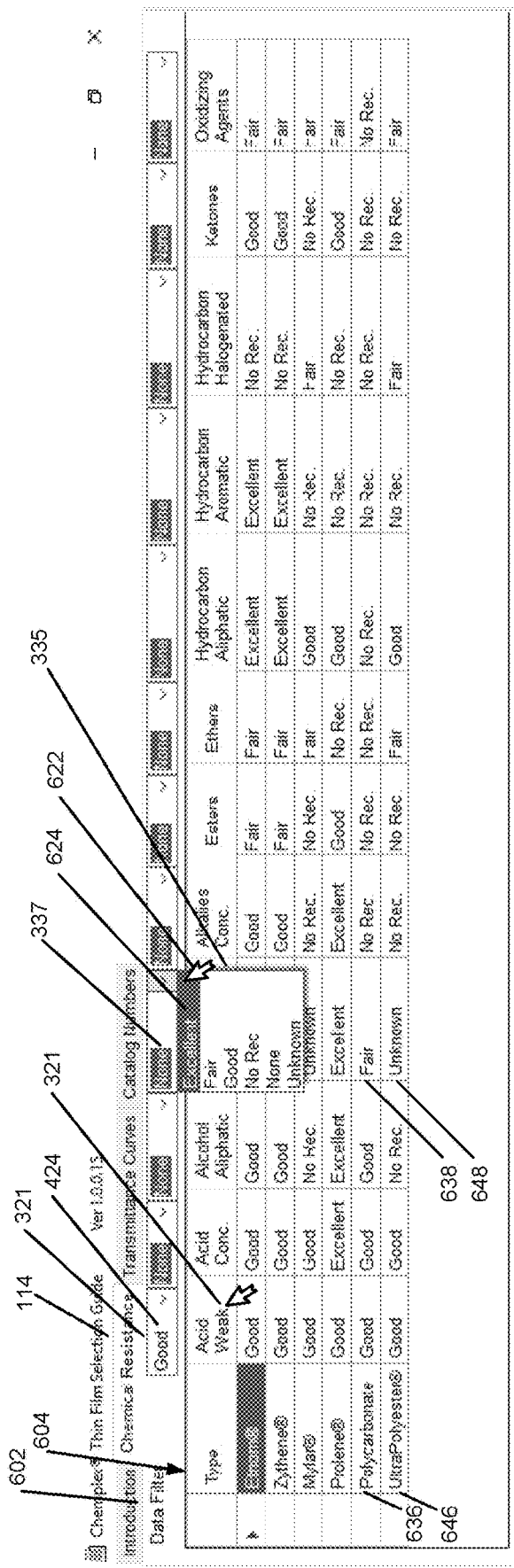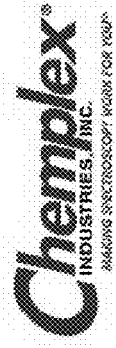
FIG. 6

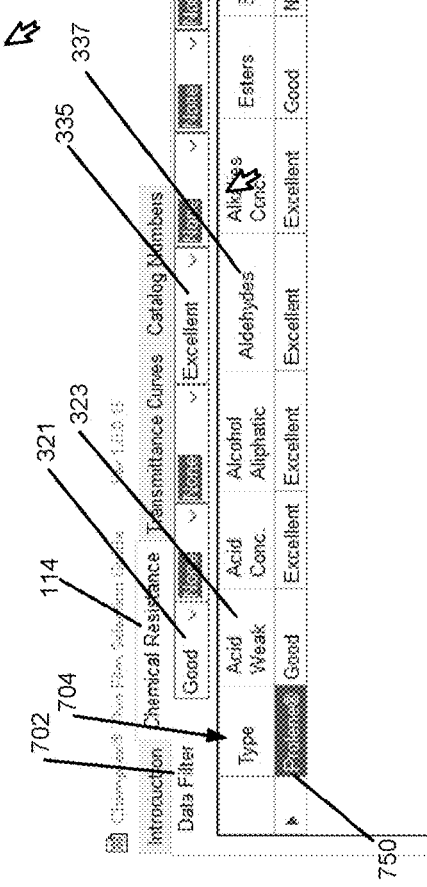
FIG. 7

FIG. 11

| Cat No | Type | Thick | Format | Size | Qty |
|---|---|---|---|---|---|
| 95 | UltraPolyester® | 1.50μm (0.06Mil) | Roll Continuous | Width 76mm (3.00") | Length 300 Ft (91 M) |
| 99 | Etnom® | 1.50μm (0.06Mil) | Roll Continuous | Width 76mm (3.00") | Length 300 Ft (91 M) |
| 100 | Mylar® | 2.50μm (0.10Mil) | Roll Continuous | Width 76mm (3.00") | Length 300 Ft (91 M) |
| 106 | Mylar® | 2.50μm (0.10Mil) | Circle, Precut | Width 63mm (2.50") | Sheets 500 |
| 107 | Mylar® | 2.50μm (0.10Mil) | Circle, Precut | Width 63mm (2.50") | Sheets 1000 |
| 150 | Mylar® | 3.60μm (0.14Mil) | Roll Continuous | Width 76mm (3.00") | Length 300 Ft (91 M) |
| 156 | Mylar® | 3.60μm (0.14Mil) | Circle, Precut | Width 63mm (2.50") | Sheets 500 |
| 157 | Mylar® | 3.60μm (0.14Mil) | Circle, Precut | Width 63mm (2.50") | Sheets 1000 |
| 158 | Mylar® | 3.60μm (0.14Mil) | Circle, Precut | Width 89mm (3.50") | Sheets 500 |
| 159 | Mylar® | 3.60μm (0.14Mil) | Circle, Precut | Width 89mm (3.50") | Sheets 1000 |
| 250 | Mylar® | 6.00μm (0.24Mil) | Roll Continuous | Width 76mm (3.00") | Length 300 Ft (91 M) |
| 256 | Mylar® | 6.00μm (0.24Mil) | Circle, Precut | Width 63mm (2.50") | Sheets 500 |
| 257 | Mylar® | 6.00μm (0.24Mil) | Circle, Precut | Width 63mm (2.50") | Sheets 1000 |
| 416 | Prolene® | 4.00μm (0.16Mil) | Roll Continuous | Width 76mm (3.00") | Length 300 Ft (91 M) |
| 425 | Polypropylene | 6.00μm (0.24Mil) | Roll Continuous | Width 76mm (3.00") | Length 300 Ft (91 M) |
| 426 | Prolene® | 4.00μm (0.16Mil) | Circle, Precut | Width 63mm (2.50") | Sheets 500 |
| 427 | Prolene® | 4.00μm (0.16Mil) | Circle, Precut | Width 63mm (2.50") | Sheets 1000 |
| 436 | Polypropylene | 6.00μm (0.24Mil) | Circle, Precut | Width 63mm (2.50") | Sheets 500 |
| 437 | Polypropylene | 6.00μm (0.24Mil) | Circle, Precut | Width 63mm (2.50") | Sheets 1000 |
| 475 | Polypropylene | 12.00μm (0.47Mil) | Roll Continuous | Width 76mm (3.00") | Length 300 Ft (91 M) |
| 476 | Polypropylene | 12.00μm (0.47Mil) | Circle, Precut | Width 63mm (2.50") | Sheets 500 |
| 477 | Polypropylene | 12.00μm (0.47Mil) | Circle, Precut | Width 63mm (2.50") | Sheets 1000 |
| 3011 | Mylar® | 2.50μm (0.10Mil) | SpectroMembrane® | Perf 63mm (2.50") | Sheets 100 |
| 3012 | Mylar® | 2.50μm (0.10Mil) | SpectroMembrane® | Perf 76mm (3.00") | Sheets 100 |

1200

Storing in a non-transitory storage medium at a first computing system a spectroscopic film selection tool that includes:

a set of machine-readable instructions configured to execute on a second computing system, wherein the machine-readable instructions are configured to elicit user input regarding attributes of a spectroscopic analysis and, based on the user input, identify one or more of a plurality of films for use in a spectroscopic analysis based on film data for each of the plurality of films, and a store of the film data for each of the plurality of films including data relating to suitability of each of the plurality of films including a film type, a film thickness, a chemical resistance to one or more types of chemicals, and energy transmittance properties

1210

Communicatively coupling the first computing system with a network from which the second computing system is able to download the spectroscopic film selection tool, whereby, following the download of the spectroscopic film selection tool at the second computing system, a user of the second computing system is able to execute the spectroscopic film selection tool on the second computing system

COMPUTER-IMPLEMENTED METHOD OF THIN-FILM SELECTION FOR SPECTROSCOPY

CROSS-REFERENCE TO RELATED APPLICATION

This application claims the benefit of U.S. Provisional Application No. 62/515,158 filed on Jun. 5, 2017, the entire contents of which is hereby incorporated by reference herein.

BACKGROUND

Spectroscopic analysis is widely used in many industrial, manufacturing, and research applications. Thin films are regularly employed in spectroscopy to contain the sample in a sample holder and prevent it from entering into the analytical instrumentation. The one of the properties of the thin film is that must be made of a material that is able to support the sample without it weakening, weeping or leaking. The thin film also attenuates the intensity between the sample being analyzed and the detection system. The goal for all spectroscopists is to select a thin-film that has the appropriate properties to contain the sample as well as being thin enough to allow enough energy to pass through for adequate material identification.

The environment in which the spectroscopic analysis is to be performed must be considered. The spectroscopic analysis may be performed in an environment in which various chemicals may be present, such as acids, alkalies, esters, ethers, oxidizing agents, and other types of chemicals. Various spectroscopic films that may be suitable for an application based on their transmittance characteristics may be wholly unsuitable based on their relative intolerance to chemicals present at the point of the analysis.

At the same time, choosing film of an appropriate material to facilitate spectroscopy is a complex endeavor. Different films, having different compositions and thicknesses, will have different transmittance characteristics for radiation of particular wavelengths or energies. Thus, one consideration in determining which film to use is the transmittance characteristics of various films to assist in choosing an appropriate film for a particular application. Thus, determining an appropriate film that satisfies these separate criteria may be a complicated task. The process of then identifying a source for a material for a film that meets all the criteria may be more complicated still.

SUMMARY

Computer-implemented methods and machine-readable instructions stored in a non-transitory media are disclosed for facilitating selection of one or more of a plurality of films for use in spectroscopic analysis based on different criteria. In particular embodiments, a spectroscopic film selection tool configured to execute on a second computing system is comprised of instructions stored at a first computing system from which the spectroscopic film selection tool may be downloaded.

In a particular embodiment, a computer-implemented method is provided to select one or more of a plurality of films for use in a spectroscopic analysis. At a first computing system, a spectroscopic film selection tool is stored in a non-transitory storage medium. The spectroscopic film selection tool includes a set of machine-readable instructions configured to execute on a second computing system. The machine-readable instructions are configured to elicit user input regarding attributes of a spectroscopic analysis and, based on the user input, identify one or more of a plurality of films for use in a spectroscopic analysis based on film data for each of the plurality of films. The film selection tool also includes a store of the film data for each of the plurality of films including data relating to suitability of each of the plurality of films including a film type, a film thickness, a chemical resistance to one or more types of chemicals, and energy transmittance properties. The first computing system is communicatively coupled with a network from which the second computing system is able to download the spectroscopic film selection tool. Following the download of the spectroscopic film selection tool at the second computing system, a user of the second computing system is able to execute the spectroscopic film selection tool on the second computing system.

In another embodiment, a non-transitory computer-readable medium stores machine-readable instructions for a spectroscopic film selection tool to select one or more of a plurality of films for use in a spectroscopic analysis. The non-transitory computer-readable medium storing the spectroscopic film selection tool includes a set of machine-readable instructions configured to execute on a second computing system. The machine-readable instructions are configured to elicit user input regarding attributes of a spectroscopic analysis and, based on the user input, identify one or more of a plurality of films for use in a spectroscopic analysis based on film data for each of the plurality of films. The non-transitory computer readable medium storing the spectroscopic film selection tool also includes a store of the film data for each of the plurality of films including data relating to suitability of each of the plurality of films including a film type, a film thickness, a chemical resistance to one or more types of chemicals, and energy transmittance properties. The set of machine-readable instructions and the store of film data are stored on a first computing system from which the set of machine-readable instructions and the store of film data are downloadable to the second the second computing system via a network.

Other systems, methods, and non-transitory computer-readable media storing machine-readable instructions are further described in detail below.

BRIEF DESCRIPTION OF THE DRAWINGS

FIGS. 2-7 are chemical resistance specification screens of a spectroscopic film selection tool according to particular embodiments of the present disclosure;

FIGS. 10 and 11 are film identification screens of a spectroscopic film selection tool according to particular embodiments of the present disclosure;

FIG. 12 is a flow diagram of a computer-implemented method of implementing a spectroscopic film selection tool according to a particular embodiment of the present disclosure;

DETAILED DESCRIPTION

Systems, computer-implemented methods, and machine-readable instructions stored in non-transitory storage media are disclosed for providing a spectroscopic film selection tool. By way of overview, particular embodiments described herein include a computer-implemented method of providing a spectroscopic film selection tool includes a set of machine-readable instructions and a store of film data stored in a non-transitory on a first computing system from which the spectroscopic film analysis tool may be downloaded via a network to a second computing system for execution. The spectroscopic film analysis tool enables a user of the second computing system to specify desired chemical resistance for films to be used in a spectroscopic analysis, evaluate energy transmittance of one or more films, and identify one or more films to be acquired. Illustrative embodiments are described below.

The screens of an illustrative embodiment of the spectroscopic film selection tool of FIGS. 1-11 are screens of the spectroscopic film selection tool executing on a second computing system onto which the spectroscopic film selection tool has been downloaded from a first computing system via a network. The spectroscopic film selection tool, which includes a set of machine-readable instructions and a store of film data, is stored on a first computing system from which it is downloaded for execution to the second computing system as further described below with reference to the computing systems and an associated network shown in FIGS. 13 and 14.

Figure 1:
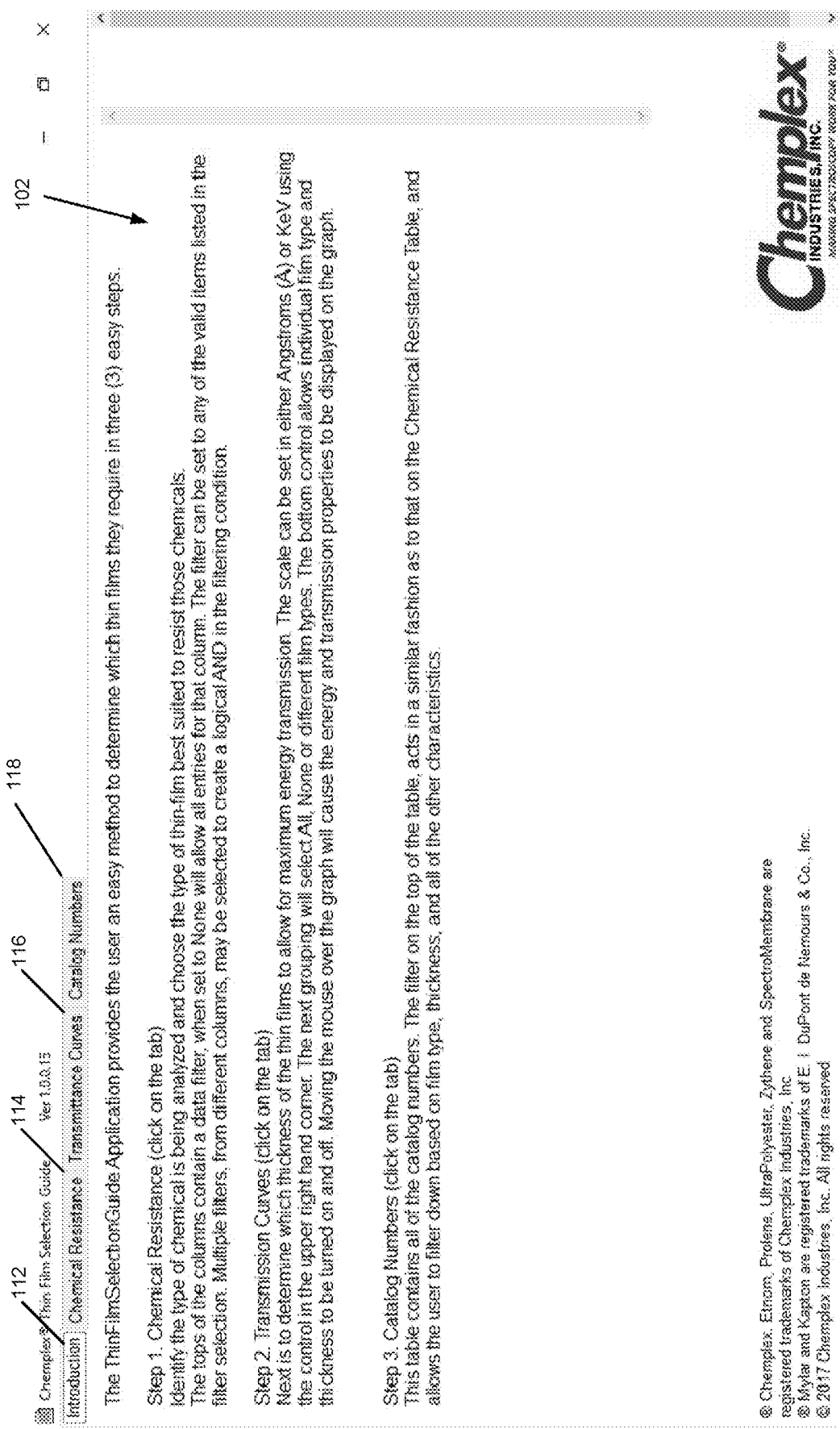
FIG. 1 is an introductory screen of a spectroscopic film selection tool according to a particular embodiment of the present disclosure.

FIG. 1 is an introductory screen 100 of a spectroscopic film selection tool according to a particular embodiment of the present disclosure. The introductory screen 100 includes a plurality of user-selectable tabs 112, 114, 116, and 118 that may be selected by a user to engage the spectroscopic film selection tool. The tabs 112, 114, 116, and 118 may be engaged via a graphical user interface using a mouse, trackball, stylus, finger-tip, or other graphical or touch-screen interface provided under Linux, Microsoft Windows, Apple OS, Android, or other operating systems under which embodiments of the spectroscopic film selection tool may execute.

A first tab 112 corresponds with the introductory screen 100 to enable the user to navigate back to this screen when desired. The introductory screen may provide instructions 102 or other content to assist the user in the operation of the spectroscopic film selection tool. From the introduction screen 100, the user also may engage a chemical resistance tab 114, a transmittance curves tab 116, or a catalog numbers tag 118 to engage other aspects of the spectroscopic film selection tool. The operation of each of these aspects is described further below.

Figure 2:
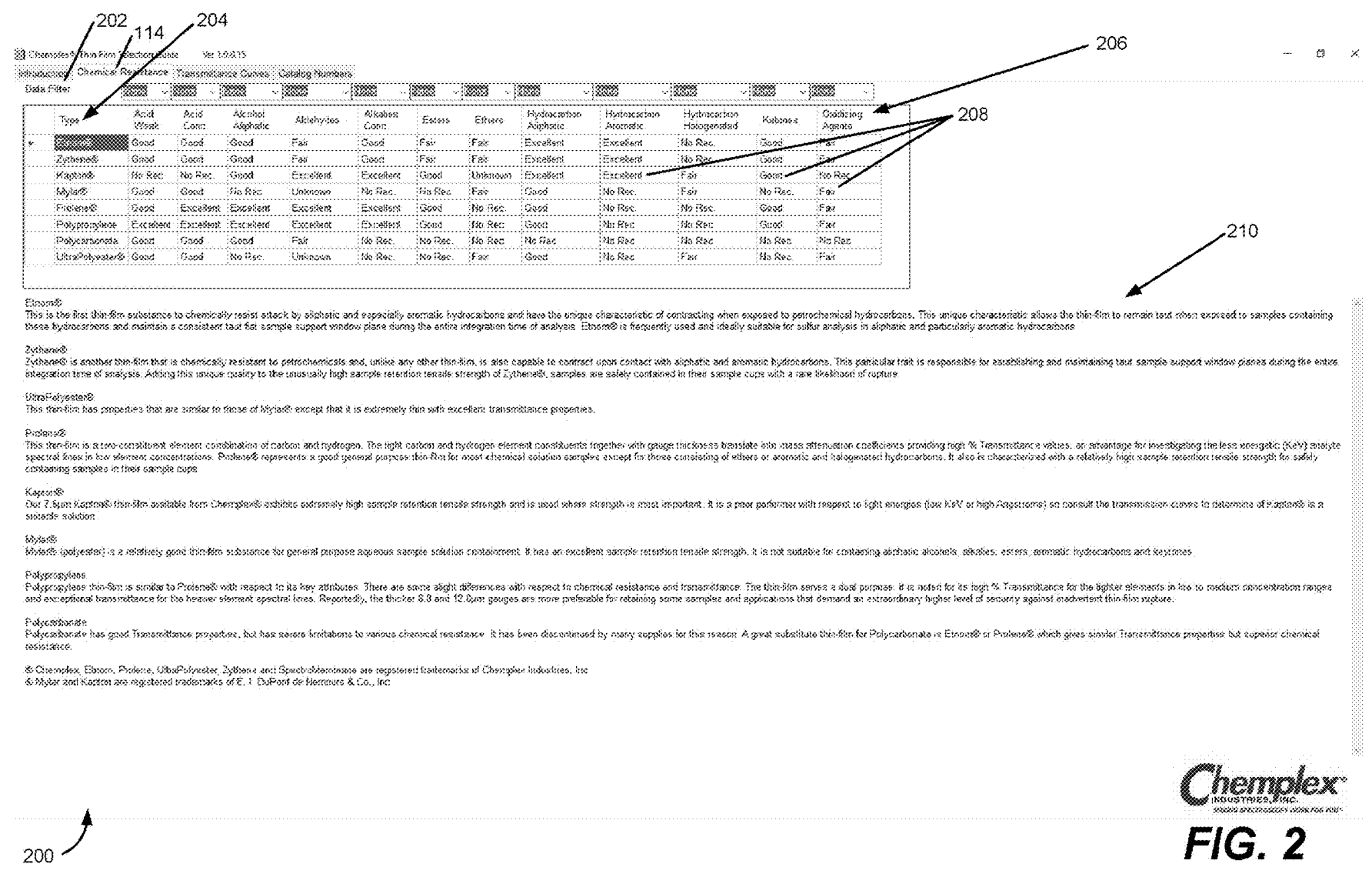

FIGS. 2 and 3 are alternate forms of chemical resistance specification screens 200 (FIG. 2) and 300 (FIG. 3) of a spectroscopic film selection tool according to particular embodiments of the present disclosure. Please note that FIG. 2 shows a version of the chemical resistance specification screen 200 in a large-screen format that may accommodate a large amount of information, whereas FIG. 3 shows a version showing less information to better fit a smaller display and, for purposes of this description, to better show specific details of the chemical resistance specification screen 300.

By way of overview, the chemical resistance specification screen 200 of FIG. 2 includes multiple sections. The chemical resistance specification screen 200 is engaged by selecting the chemical resistance tab 114, as described with reference to FIG. 1. A data filter 202, in a particular embodiment, is presented in the form of a table as shown in FIG. 2. The data filter 202 includes a film type list 204 including entries for each of the various film types included in the spectroscopic film selection tool (which may be included in a store of film data incorporated in the spectroscopic film selection tool, as further described below). The film type list 204 may list various film types by a generic name or by a trademarked name. In the particular embodiment of FIG. 2, the film type list 204 is presented along a vertical axis of the data filter 202. The data filter 202 also includes a list of chemical types 206 which may be present in an environment at a spectroscopic analysis, therefore necessitating a determination of chemical resistance to such chemical types. In the particular embodiment of FIG. 2, the list of chemical types is listed across a horizontal axis of the data filter 202. For each of the entries in the film type list 204 along the vertical axis of the data filter 202 and each of the chemical types included in the list of chemical types 206 arrayed along the horizontal axis of the data filter 202, the data filter 202 includes a chemical resistance 208. In a particular embodiment, the chemical resistance to a type of chemicals may be specified as one of "Excellent," "Good," "Fair," "Not Recommended" ("No. Rec."), or "Unknown" (if data is not available). In addition, the chemical resistance specification screen 200 may include an information section 210 that provides general information about various film types that may be included in the film type list 204 in the data filter 202.

FIG. 3 shows a chemical resistance specification screen 300 using a larger typeface and displaying less information than the chemical resistance specification screen 200 of FIG. 2. It will be appreciated that different devices that may be used as the second computing device to execute the spectroscopic film selection tool may have displays of different sizes, or the user may elect to display screens using a larger font for ease of use. It should be noted that the data filter 302 of chemical resistance specification screen 300 includes all the same columns and rows as the data filter 202 of the chemical resistance specification screen 200 of FIG. 2. The only content difference is that less of the content included in the information section 210 of FIG. 2 fits in an information section 310 of the resistance specification screen 300 of FIG. 3 on a single screen. However, a user may engage a scroll bar 311 in the information section 310 of the resistance specification screen 300 of FIG. 3 to view additional content that may not fit on a single screen, as is understood by users of graphical user interface systems.

On the chemical resistance specification screen 300 of FIG. 3, the data filter 302 includes film type list 304 which includes, for example, Etnom®, Zythene®, Kapton®, Mylar®, Prolene®, Polypropylene, Polycarbonate, and UltraPolyester®. Other films may be included in the data filter 302, for example, by adding them to the store of film data in the spectroscopic film selection tool. For each of the film types included in the film type list, for a range of chemical types included in a list of chemical types 306, a user may specify a desired level of resistance to each of the chemical types. In a particular embodiment shown in FIGS.

2-7, a user selects the desired level of resistance by engaging a pull-down menu associated with each of the chemical types, as further described below. Alternatively, selection could be provided with radio buttons or any other type of selection that may be suitable for the chemical resistance specification screen 300.

Specifically, on the chemical resistance specification screen 300, a user may choose a desired level of chemical resistance to any of twelve chemical types. To specify a desired level of chemical resistance for a film to weak acids ("Acid Weak"), 321, a user may engage an associated pull-down menu 323. If weak acids are not expected to be present or no tolerance to the same is needed, a default setting for the pull-down menu is "None," which is a default setting for each of the pull-down menus described with reference to the chemical resistance specification screen 300. As will be further described below, in particular embodiments, selection of a chemical resistance other than "None" for one of the chemicals in the list of chemical types 306 in the data filter 302 may result in removal of a particular film type in the list of film types 304 from the data filter.

A user may similarly specify a desired level of chemical resistance for each of the remaining chemical types in the list of chemical types 306. To specify a desired level of resistance to concentrated acids ("Acid Conc.") 325, a user may engage an associated pull-down menu 327. To specify a desired level of resistance to aliphatic alcohol ("Alcohol Aliphatic") 331, a user may engage an associated pull-down menu 333. To specify a desired level of resistance to aldehydes 335, a user may engage an associated pull-down menu 337. To specify a desired level of resistance to concentrated alkalies ("Alkalies Conc.") 341, a user may engage an associated pull-down menu 343. To specify a desired level of resistance to esters 345, a user may engage an associated pull-down menu 347. To specify a desired level of resistance to ethers 351, a user may engage an associated pull-down menu 353. To specify a desired level of resistance to aliphatic hydrocarbons ("Hydrocarbon Aliphatic") 355, a user may engage an associated pull-down menu 357. To specify a desired level of resistance to aromatic hydrocarbons ("Hydrocarbon Aromatic") 361, a user may engage an associated pull-down menu 363. To specify a desired level of resistance to halogenated hydrocarbons ("Hydrocarbon Halogenated") 365, a user may engage an associated pull-down menu 367. To specify a desired level of resistance to ketones 371, a user may engage an associated pull-down menu 373. To specify a desired level of resistance to oxidizing agents 375, a user may engage an associated pull-down menu 377. Examples of operation of the pull-down menus and their effect are described below.

Figure 4:
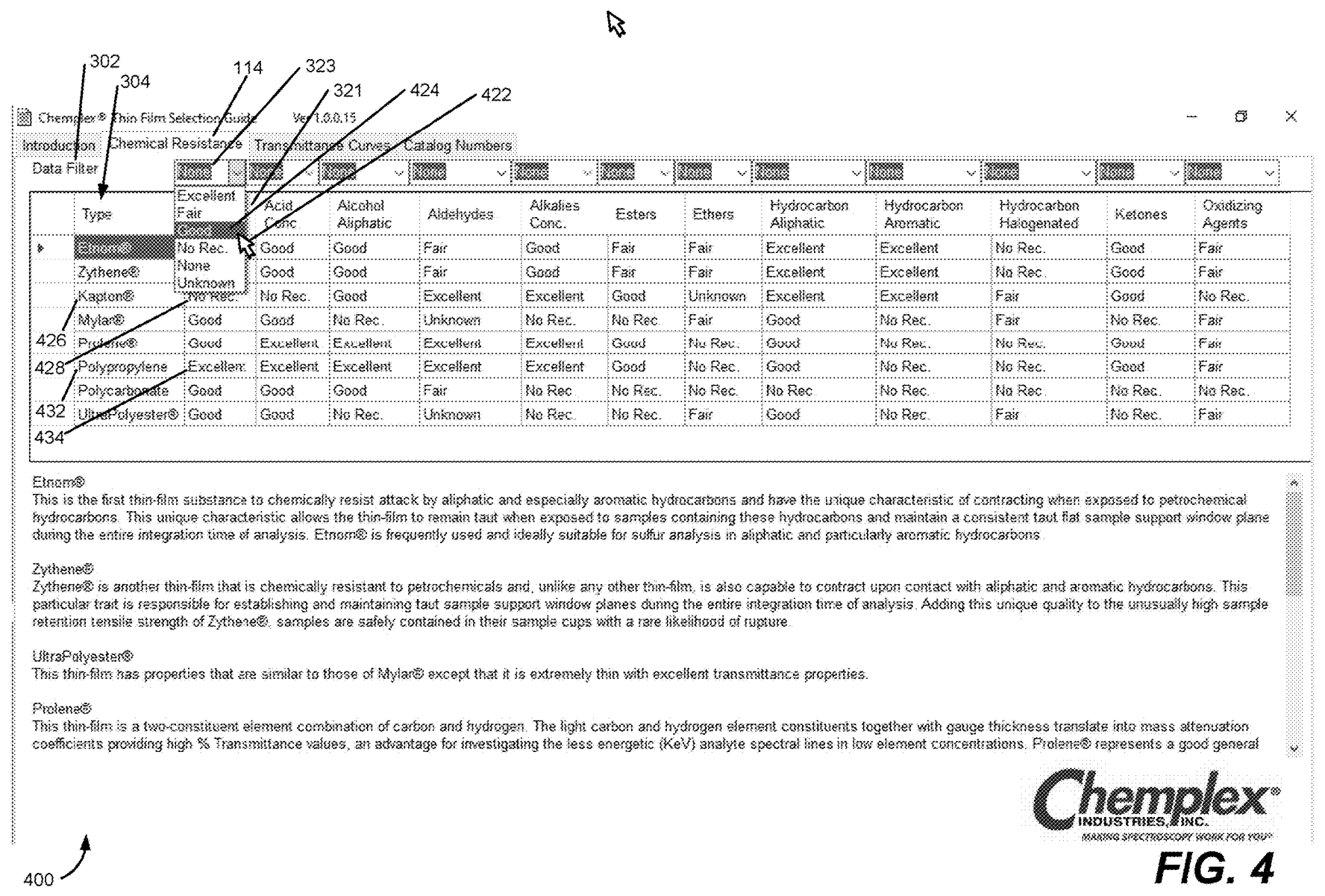

FIG. 4 shows a chemical resistance specification screen 400 on which the user has engaged the pull-down menu 323 to specify a selected level of resistance to weak acids 321 (because the pull-down menu obscures the chemical type, it may be desired to compare the chemical resistance specification screen 400 with the chemical resistance specification screen 300 of FIG. 3). Specifically, the user manipulates a cursor 422 to select a "Good" level of resistance 424 to weak acids 321 to help to identify an appropriate film for a spectroscopic analysis where weak acids may be present.

FIG. 5 shows a chemical resistance specification screen 500 after the user has selected the "Good" level of resistance 424 to weak acids 321 by releasing controls for the cursor (not shown in FIG. 5) to complete the selection from the pull-down menu 323. Selection of the "Good" level of resistance 424 to weak acids 321 has removed from the data filter 502 any of the film types in the type list 504 that have other than the "Good" level of resistance 424 to weak acids. Removing films that lack the desired chemical resistance helps the user to select an appropriate film for the spectroscopic analysis by eliminating from consideration any films which do not have the desired level of resistance to weak acids 321. For example, by comparison with FIG. 4, Kapton® 426 has been removed from the film type list 504 because it is characterized as not recommended ("No rec.") 426 for use with weak acids 321. Similarly, Polypropylene 432 has been removed from the film type list 504 because it is characterized as having an "Excellent" 434 resistance to weak acids, which is more than what is specified by the user. Thus, in the embodiment of FIG. 5, all films previously listed in the data filter 302 (FIGS. 3 and 4) that do not have the desired "Good" level of resistance 424 to weak acids 321 have been removed, including any that may have had a resistance better than "Good" (e.g., "Excellent").

In various embodiments of the spectroscopic film selection tool, the data filter 502 may be set to include in the film type list 504 only films that have the desired level of resistance, as shown in FIG. 5, or to include in the film type list 504 any films with a resistance greater than or equal to the desired level of resistance. In the latter case, for example, Polypropylene 432 would still have been included in the film type list 504 because its "Excellent" 434 resistance to weak acids still meets the desired level of resistance, even though its "Excellent" 434 resistance to weak acids exceeds the desired standard of resistance.

FIG. 6 shows another chemical resistance screen 600 in which a user specifies an additional desired level of chemical resistance in combination with the chemical resistance specified in FIG. 4. In a particular embodiment, specified desired levels of resistance to multiple types of chemicals are combined with a Boolean algebraic "AND" operation so that the data filter 602 will list only those types of films that meet each of the specified desired levels of resistance. Referring to FIG. 6, the user has engaged the pull-down menu 337 to specify a selected level of resistance to aldehydes 333 (because the pull-down menu obscures the chemical type, it may be desired to compare the chemical resistance specification screen 600 with the chemical resistance specification screen 500 of FIG. 5). Specifically, the user manipulates a cursor 622 to select an "Excellent" level of resistance 624 to aldehydes 333 to help to identify an appropriate film for a spectroscopic analysis where aldehydes may be present in addition to weak acids, as was previously indicated with reference to the chemical resistance screen 400 of FIG. 4.

FIG. 7 shows a chemical resistance specification screen 700 after the user has selected the "Excellent" level of resistance 624 (FIG. 6) to aldehydes 335 by releasing controls for the cursor (not shown in FIG. 7) to complete the selection from the pull-down menu 337. Selection of the "Excellent" level of resistance 624 to aldehydes 335 has removed from the data filter 702 any of the film types in the type list 704 that have other than an "Excellent" level of resistance 424 to weak acids. For example, by comparison with FIG. 6, Polycarbonate 636 and UltraPolyester® 646 were included in the chemical type list 604 of the data filter 602 because each had the specified desired "Good" level of chemical resistance 424 to weak acids 321 specified by the user in FIG. 4; however, neither Polycarbonate 636 (having a "Fair" level of chemical resistance to aldehydes 638) nor UltraPolyester® 646 (for which the level of chemical resistance to aldehydes is indicated as "Unknown" 648) is included because their level of chemical resistance does not match the specified desired level of resistance. Thus, in the embodiment of FIG. 7, all films originally listed in the data filter 602, Polycarbonate 636, UltraPolyester® 646, and others not having the "Excellent" level of chemical resistance 624 specified by the user have been removed from the data filter. Thus, by combining the specified desired level of chemical resistance to weak acids 321 and aldehydes 335, the user is left with one type of film to consider for the application: Prolene® 750. It will be appreciated that, for other combinations, there may be more than one type of film left for consideration; however, in this example, Prolene® 750 was the only type of film that had the specified desired levels of chemical resistance entered by the user in FIGS. 4 and 6.

Figure 8:
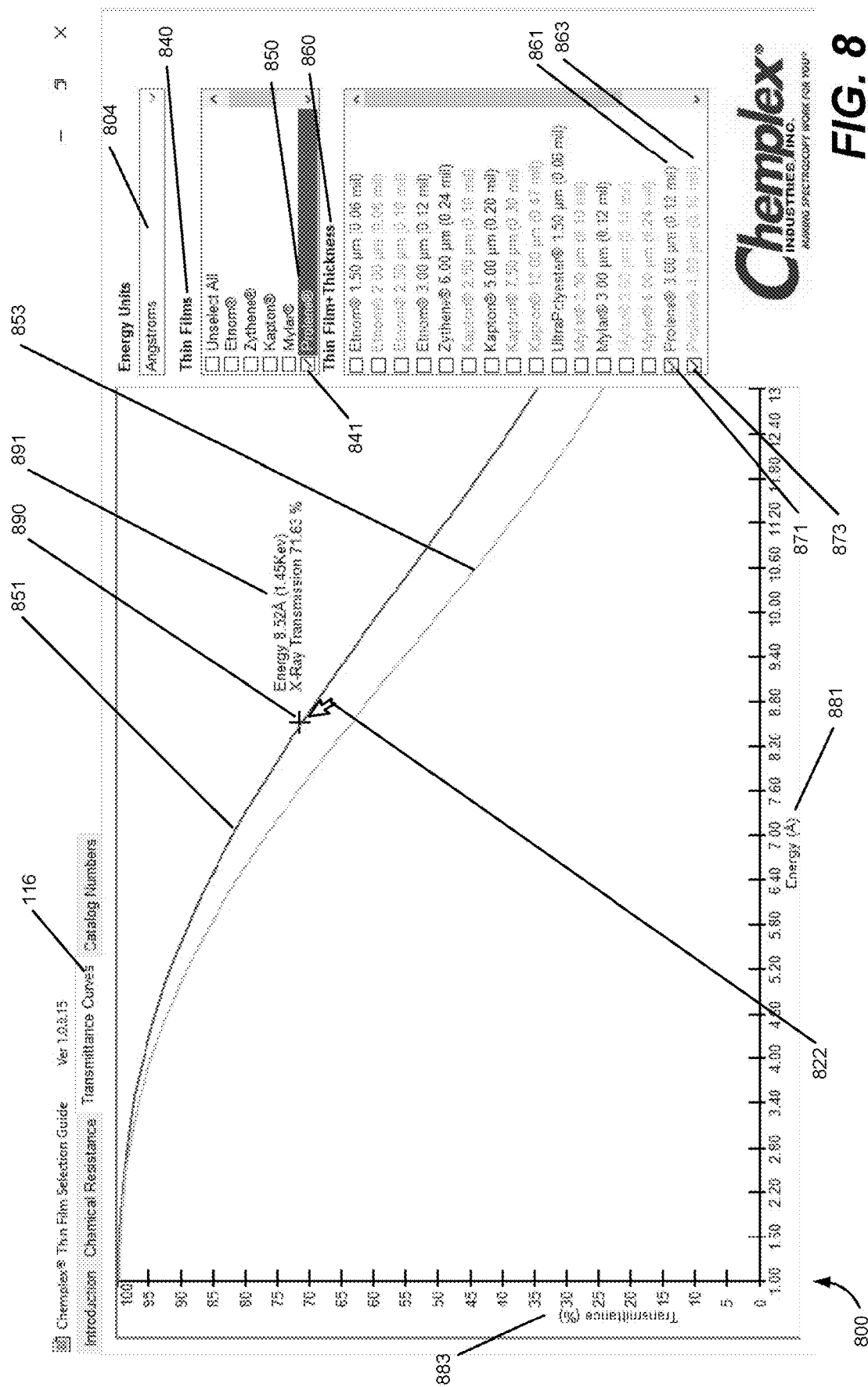
FIGS. 8-9 are energy transmittance screens of a spectroscopic film selection tool according to particular embodiments of the present disclosure.

Referring to FIG. 8, in a particular embodiment of the disclosure, once specified desired levels of chemical resistance as described with reference to FIGS. 2-7 have been presented, the spectroscopic film selection tool presents transmittance curves, such as transmittance curves 851 and 853, for available thicknesses of films that have the specified desired levels of chemical resistance on a transmittance curve screen 800. The transmittance curve screen 800 is accessible by user selection of the transmittance curves tab 116, first referenced in FIG. 1.

As described with reference to FIG. 7, Prolene® 750 was the only type of film that had the specified desired levels of chemical resistance entered by the user in FIGS. 4 and 6. Thus, according to a particular embodiment, the transmittance curve screen 800 shown in FIG. 8 displays transmittance curves 851 and 853 for available Prolene® 750 films. The transmittance curve 851 displays transmittance characteristics for an available Prolene® film having a thickness of 3.00 micrometers (0.12 mil) 861 and an available Prolene® film having a thickness of 4 micrometers (0.16 mils) 863 included in an available film and film thickness list 860. In a particular embodiment, the transmittance curves 851 and 853 are presented in different colors that correspond with colors of the corresponding films 861 and 863, respectively, listed in the thin film and film thickness list 860.

Which film type and thicknesses are presented on the transmittance curve screen 800 is identified and controllable by checkboxes included in a thin film list 840 and the thin film and thickness list 860. A checked checkbox 841 associated with a Prolene® entry in the thin film list 840 indicates that the transmittance curves 851 and 853 displayed are of Prolene®. Correspondingly, checked checkboxes 871 and 873 associated with the available Prolene® film having a thickness of 3.00 micrometers (0.12 mil) 861 and the available Prolene® film having a thickness of 4 micrometers (0.16 mils) 863 included in the film and film thickness list 860 indicate the thicknesses of Prolene® films for which the transmittance curves 851 and 853 are displayed.

A user selection to uncheck these checkboxes or to check other checkboxes will cause transmittance curves corresponding with various thicknesses of various films associated with the unchecked checkboxes to be removed from the transmittance curve screen 800, while checking previously unchecked checkboxes will allow for transmittance curves of various thicknesses of other films to be displayed. In a particular embodiment, a user can check or uncheck other checkboxes by manipulating a cursor 822 (using a touchscreen, mouse, or other pointing device).

The transmittance screen 800 of FIG. 8 shows transmittance curves such as transmittance curves 851 and 852 plotted for percentage transmittance ("Transmittance (%)") 883 against energy 881 which, on the transmittance screen 800, is represented in Angstroms. It will be appreciated that energy is proportional to a frequency of particular radiation and, thus, inversely proportional to wavelength, as is understood by those ordinarily skilled in the art. The user may select whether to plot the transmittance curves against energy as related to Angstroms (representing wavelength) or energy, for example, expressed in kilo-electron volts ("KeV") as described below by engaging a selection menu 804 with the cursor 822. FIG. 8 also shows that a user may move the cursor 822 relative to the axes specifying energy 881 and percentage transmittance 883 for a readout of the energy units and percentage transmittance at each point. Thus, for example, the cursor 822 is positioned at a point 890 that happens to fall along the transmittance curve 851 that yields a readout 891 indicating that the energy at the point 890 is 8.25 Angstroms (or 1.45 KeV) and the percentage transmission of X-Rays is 71.63%.

Figure 9:
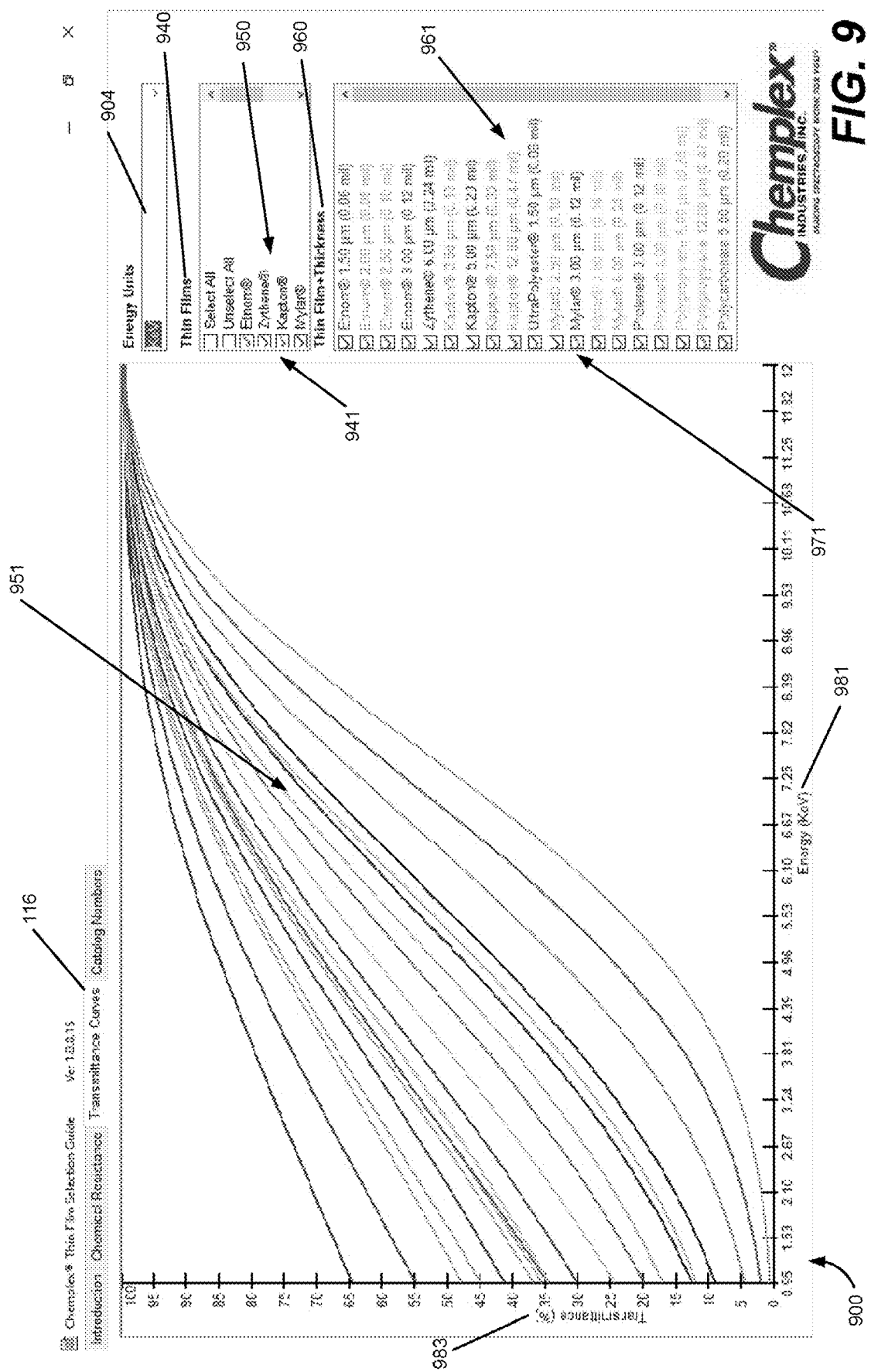

FIG. 9 shows a transmittance curve screen 900 showing transmittance curves 951 for all films and thicknesses. As previously described with reference to FIG. 8, according to a particular embodiment of the disclosure, transmittance curves may only be displayed for those films having a specified desired chemical resistance and shown in FIG. 8. Alternatively, an embodiment of the spectroscopic film selection tool may show the transmittance curves 951 for all of the films 950 included in the thin films list 940 and for all of the thicknesses 961 included in the thin film and film thickness list 960. It should be noted that all of the checkboxes 941 and 971 included in the thin films 940 and thin film and thicknesses lists 960 are checked; a user may choose to uncheck or check any of the checkboxes 941 and 971 to remove or display, respectively, any particular presented transmission curves 951. Similarly, it will be appreciated that the transmission curve screen 900 may be presented without any of the transmission curves 951 displayed, giving a user the option to manually check any of the checkboxes 941 and 971 in the thin films list 940 and the thin film and thicknesses list 960 to present transmittance curves just for those selected films and film thicknesses.

The transmittance curves 951 included in the transmittance curve screen 900, as in the case of the transmittance curve screen 800 of FIG. 8, plot the transmittance curves for percentage transmittance ("Transmittance (%)") 983 against energy 981. However, in contrast to FIG. 8, on the transmittance screen 900, the selected or default energy unit 904 is KeV rather than Angstroms, as was the case in FIG. 8. Because of the inverse relationship of energy to wavelength, while the transmittance curves 851 and 853 on the transmittance screen 800 of FIG. 8 showed a decreasing percentage transmittance 883 for increasing wavelengths, i.e., the energy 881 of transmittance screen 800 of FIG. 8, the transmittance curves 951 on the transmittance screen 900 of FIG. 9 show increasing percentage transmittance 983 for increasing energy 981.

Using the transmittance curve screens like the exemplary transmittance curve screens 800 of FIG. 8 and 900 of FIG. 9, the user may evaluate the percentage transmittance relative to energy. The user may add or remove different film types and film thicknesses to suit a particular application.

Figure 10:
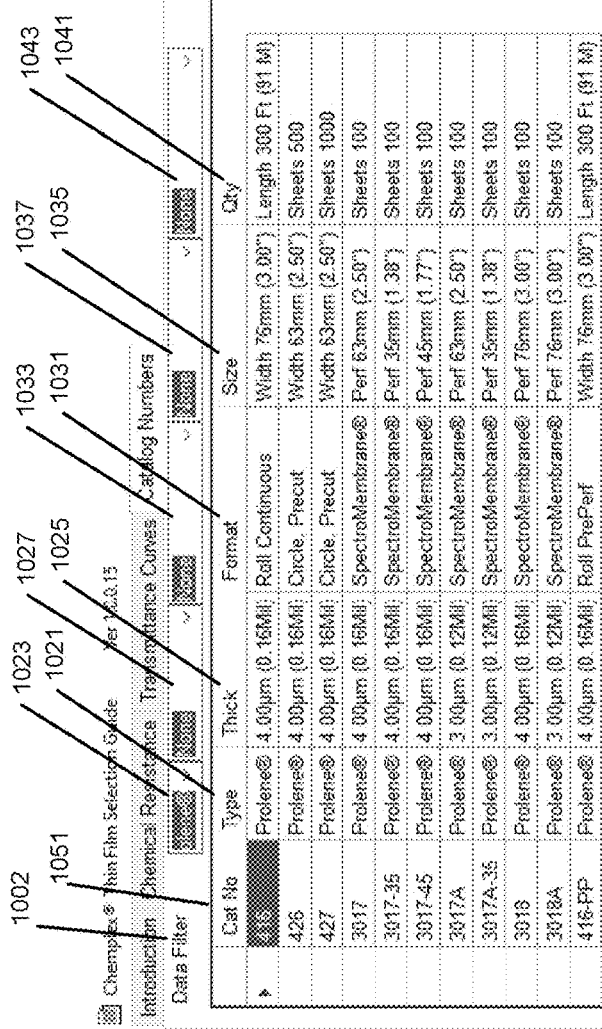

Referring to FIG. 10, in a particular embodiment of the disclosure, once specified desired levels of chemical resistance as described with reference to FIGS. 2-7 have been presented and considered and the transmittance curves have been considered as described with reference to FIGS. 8 and 9, embodiments of the spectroscopic film selection tool present a catalog screen 1000. The catalog screen 1000 presents listings of available film types 1021, thicknesses 1025, formats (e.g., continuous roll, precut, etc.) 1031, sizes (i.e., non-thickness dimensions of the film) 1035, and quantity (expressed in numbers of sheets or length of material in continuous roll) 1041. The catalog screen 1000, like the chemical resistance screens of FIGS. 2-7, is presented as a data filter 1002 from which each of the parameters 1021, 1025, 1031, 1035, and 1041 may be selected using associated pull-down menus 1023, 1027, 1033, 1037, and 1043, respectively. In a particular embodiment, the pull-down menus 1023, 1027, 1033, 1037, and 1043 operate similarly to the pull-down menus on the chemical resistance screens of FIGS. 2-7, as previously described. Each of the available film items is associated with one of a number of unique catalog numbers 1051 to make it easy for a user to identify a desired film not only by its type, thickness, format, size, and quantity, but by a specific catalog number 1051 to simplify acquisition of the desired film. The catalog number 1051 may be that of a particular vendor who may maintain the first computing system and provide the spectroscopic film selection tool stored thereon.

In a particular embodiment, the catalog screen 1000 is keyed to the chemical resistance screens (FIGS. 2-7) and the transmission curve screens (FIGS. 8 and 9) such that, based on a user's input of chemical resistance types and transmission curves of interest, the catalog screen 1000 presents choices for the film type or types 1021 and film thickness or thicknesses 1025 of interest.

In an alternative embodiment, a default form of a catalog screen 1100 presents listings of all available film types 1121, thicknesses 1125, formats (e.g., continuous roll, precut, etc.) 1031, sizes (i.e., non-thickness dimensions of the film) 1135, and quantity (expressed in numbers of sheets or length of material in continuous roll) 1141 as shown in FIG. 11. The catalog screen 1100, like the chemical resistance screens of FIGS. 2-7, is presented as a data filter 1102 from which each of the parameters 1121, 1125, 1131, 1135, and 1141 may be selected using associated pull-down menus 1123, 1127, 1133, 1137, and 1143, respectively. In a particular embodiment, the pull-down menus 1123, 1127, 1133, 1137, and 1143 operate similarly to the pull-down menus on the chemical resistance screens of FIGS. 2-7, as previously described. Each of the available film items is associated with one of a number of unique catalog numbers 1151 to make it easy for a user to identify a desired film not only by its type, thickness, format, size, and quantity, but by a specific catalog number 1151 to simplify acquisition of the desired film In the embodiment of FIG. 11, the catalog screen 1100 is not keyed to the chemical resistance screens (FIGS. 2-7) or the transmission curve screens (FIGS. 8 and 9) to automatically reduce the films listed based on a user's input of chemical resistance types and transmission curves of interest, as in the embodiment of FIG. 10. Instead, the user may use the pull-down menus 1123, 1127, 1133, 1137, and 1143 to selectively reduce the films for possible selection and acquisition.

FIG. 12 is a flow diagram of a computer-implemented method of implementing a spectroscopic film selection tool according to a particular embodiment of the present disclosure. The computer-implemented method 1200 may be performed by machine-readable instructions stored on non-transitory computer-readable media accessible by computing systems as described with reference to FIGS. 13 and 14. According to an embodiment of the computer-implemented method 1200, at 1210, a spectroscopic film selection tool is stored in a non-transitory storage medium at a first computing system. The spectroscopic film selection tool includes a set of machine-readable instructions configured to execute on a second computing system, where the machine-readable instructions are configured to elicit user input regarding attributes of a spectroscopic analysis and, based on the user input, identify one or more of a plurality of films for use in a spectroscopic analysis based on film data for each of the plurality of films. The spectroscopic film selection tool also includes a store of the film data for each of the plurality of films including data relating to suitability of each of the plurality of films including a film type, a film thickness, a chemical resistance to one or more types of chemicals, and energy transmittance properties. At 1220, the first computing system is communicatively coupled with a network from which the second computing system is able to download the spectroscopic film selection tool. Following the download of the spectroscopic film selection tool at the second computing system, a user of the second computing system is able to execute the spectroscopic film selection tool on the second computing system.

Figure 13:
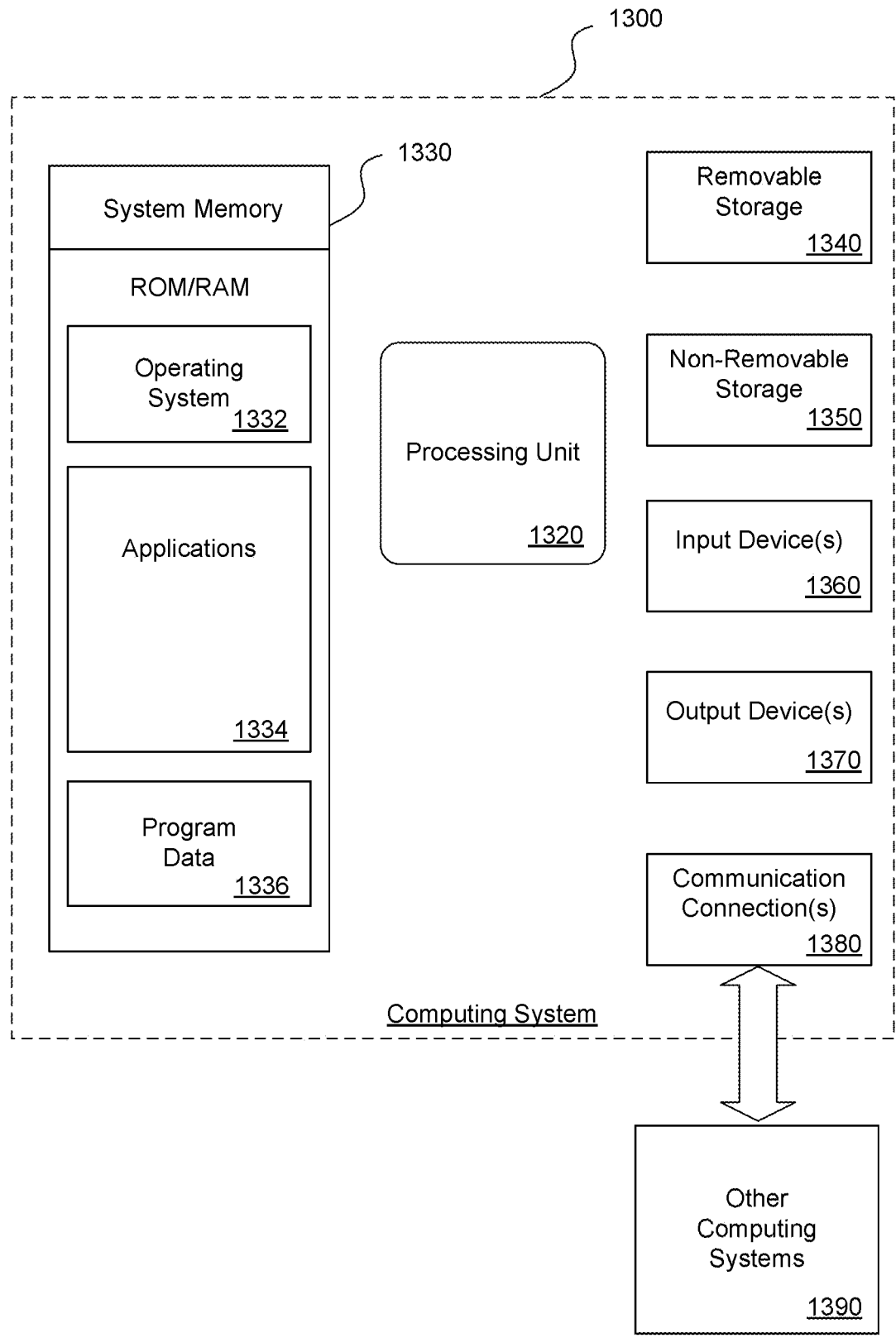
FIG. 13 is a block diagram of representative computing system that may represent the first computing system where a spectroscopic film selection tool is stored in a non-transitory computer-readable medium and/or the second computing system to which the spectroscopic film selection tool is downloaded and executed according to particular embodiments of the present disclosure.

FIG. 13 is a representative computing system 1300 that may represent the first computing system where a spectroscopic film selection tool is stored in a non-transitory computer-readable medium and/or the second computing system to which the spectroscopic film selection tool is downloaded and executed according to particular embodiments of the present disclosure. The computing system 1300 may include any of a number of forms of stationary or mobile computing devices as described with reference to FIG. 13. The computing system 1302 typically includes at least one processing unit 1320 and a system memory 1330. Depending on the exact configuration and type of computing device, the system memory 1330 may be volatile (such as RAM), non-volatile (such as ROM, flash memory, and the like) or some combination of the two. The system memory 1330 typically maintains an operating system 1332, one or more applications 1334, and program data 1336. The operating system 1332 may include any number of operating systems executable on desktop or portable devices including, but not limited to, Linux, Microsoft Windows, Apple OS, or Android. The one or more applications 1334, on a second computing system, may include the spectroscopic film selection tool described herein and communication applications enabling a user of the second computing system to access a network to access and download the spectroscopic film selection tool. On a first computing system, the one or more applications may include server software that receives and processes requests to download the spectroscopic film selection tool.

The computing system 1300 may also have additional features or functionality. For example, the computing system 1300 may also include additional data storage devices (removable and/or non-removable) such as, for example, magnetic disks, optical disks, or tape. Such additional storage is illustrated in FIG. 13 by removable storage 1340 and non-removable storage 1350. Computer storage media may include volatile and non-volatile, removable and non-removable media implemented in any method or technology for storage of information, such as computer readable instructions, data structures, program modules or other data. The system memory 1330, the removable storage 1340, and the non-removable storage 1350 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 1330. Any such computer storage media may be part of the computing system 1330. The computing system 1330 may also have input device(s) 1360 such as a keyboard, mouse, pen, voice input device, touch input device, etc. Output device(s) 1370 such as a display, speakers, printer, etc., may also be included.

The computing system 1300 also may include one or more communication connections 1380 that allow the computing system 1300 to communicate with other computing systems 1390, such as over a wired or wireless network. The one or more communication connections 1380 are an example of communication media. Available forms of communication media typically carry computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Thus, the computing system 1300 may include a first computing system where the spectroscopic film selection tool is stored in one or more of system memory 1330, removable storage 1340, and non-removable storage 1350. Then, via the one or more communications connections 1380, the second computing system may be one of the other computing systems 1390 that may communicate with the first computing system to download the spectroscopic film selection tool. Alternatively, the computing system 1300 may include a second computing system that accesses the first computing system, which is one of the other computing systems 1390, via the communications connections 1380 over a network to download the spectroscopic film selection tool. The downloaded spectroscopic film selection tool is then stored in removable storage 1340 or non-removable storage 1350 from which it can be loaded into system memory 1330 for execution by the processing unit 1320.

Figure 14:
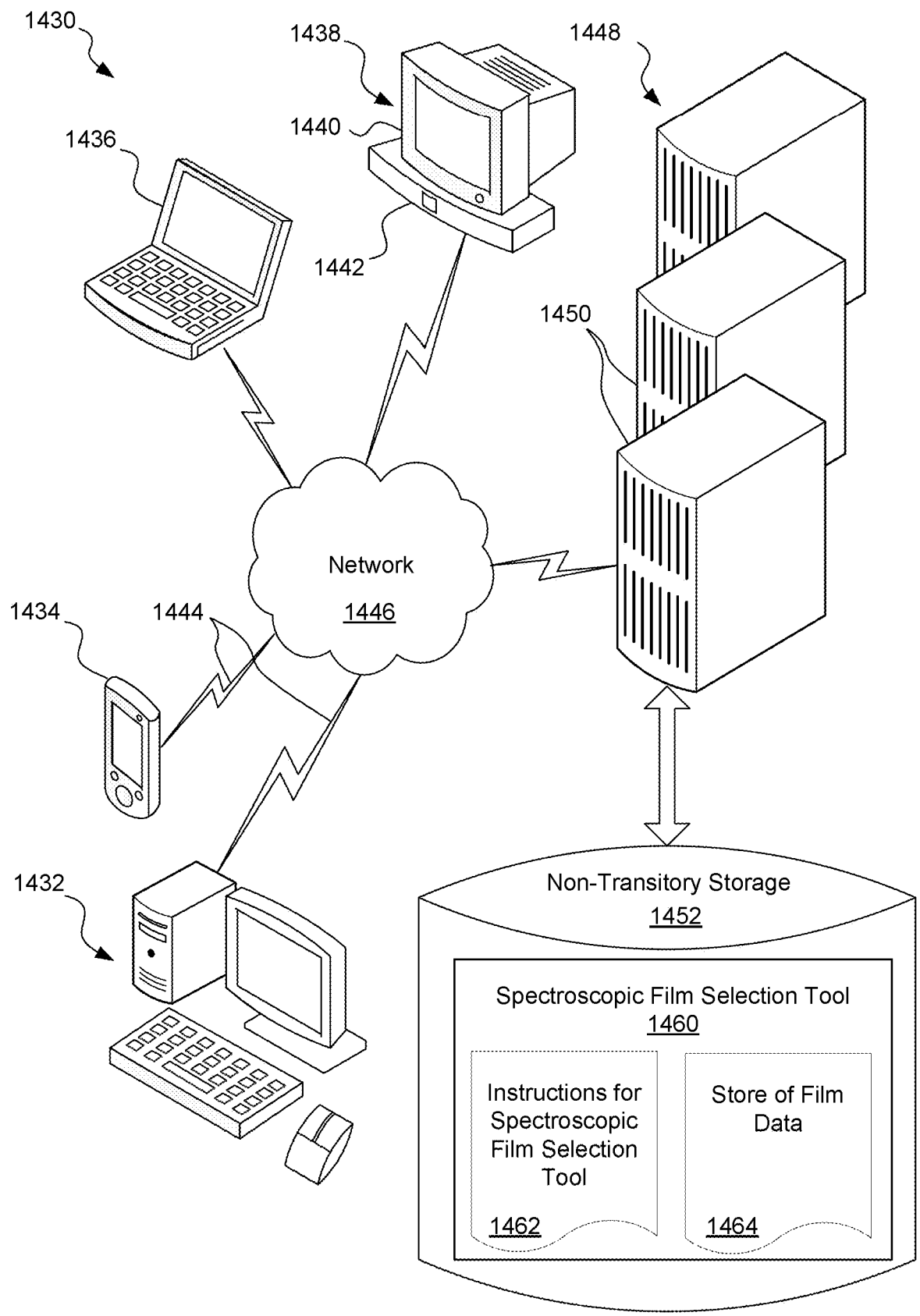
FIG. 14 is a schematic diagram of a computer network in which a spectroscopic film selection tool may be downloaded from the first computing system to the second computing system according particular embodiments of the present disclosure.

FIG. 14 is a computer network 1400 in which a spectroscopic film selection tool may be downloaded from the first computing system to the second computing system according particular embodiments of the present disclosure. Specifically, FIG. 14 illustrates a network environment 1430 in which a plurality of client or user computing systems, acting as second computing systems 1432-1438 of various types communicate over a network 1446 with a first computing system 1448 from which the spectroscopic film selection tool is provided for download to one of the second computing systems 1432-1438. The second computing systems 1432-1438 may include different types of computing systems. For example, a second computing system may be a desktop computing system 1432. A second computing system also may include a portable handheld computing system 1434 such as a tablet, smartphone, or similar device. A second computing system may include a notebook computer or other type of portable computer 1436. A second computing system also may include a media device 1438, such as a display 1440 coupled with a communications unit 1442, such as a media-enabled computer, a set-top box, or similar device. The client computing systems 1432-1438 communicate over the network 1446 using wireless and/or non-wireless communications media 1444. The network 1440 may include the Internet, one or more intranets, and other networks.

The second computing systems 1432-1438, in some implementations, are able to communicate with the first computing system 1448 over the network 1446 to obtain the spectroscopic film selection tool 1460, which may include the machine-readable instructions 1462 and the store of film data 1464 stored in non-transitory storage 1452 accessible buy the first computing system 1448. The store of film data 1464 may be updated regularly or on an ad hoc basis, and when the spectroscopic film selection tool is downloaded, an updated version of the store of film data 1464 may be included in the spectroscopic film selection tool 1460 at download. The first computing system 1448 may include a plurality of servers 1450 that access the non-transitory storage 1452 and communicate with the second computing systems 1432-1438 via the network 1446.

While the disclosure has been set forth herein in reference to specific aspects, features and illustrative aspects, it will be appreciated that the utility of the disclosure is not thus limited, but rather extends to and encompasses numerous other variations, modifications and alternative aspects, as will suggest themselves to those of ordinary skill in the field of the present disclosure, based on the description herein. Any of various elements or features recited herein is contemplated for use with other features or elements disclosed herein, unless specified to the contrary. Correspondingly, the invention that may be hereinafter claimed is intended to be broadly construed and interpreted, as including all such variations, modifications and alternative aspects, within its spirit and scope.

What is claimed is:

1. A computer-implemented method to select one or more of a plurality of films for use in a spectroscopic analysis, the method comprising:
storing in a non-transitory storage medium at a first computing system a spectroscopic film selection tool, the spectroscopic film selection tool including:
a set of machine-readable instructions configured to execute on a second computing system, wherein the machine-readable instructions are configured to elicit user input regarding attributes of a spectroscopic analysis and, based on the user input, identify one or more of a plurality of films for use in a spectroscopic analysis based on film data for each of the plurality of films; and
a store of the film data for each of the plurality of films including data relating to suitability of each of the plurality of films including:
a film type;
a film thickness;
a chemical resistance to one or more types of chemicals; and
energy transmittance properties; and
communicatively coupling the first computing system with a network from which the second computing system is able to download the spectroscopic film selection tool, whereby, following the download of the spectroscopic film selection tool at the second computing system, a user of the second computing system is able to execute the spectroscopic film selection tool on the second computing system.

2. The computer-implemented method of claim 1, wherein the user input includes a desired level of chemical resistance to one or more of a plurality of types of chemicals that may be present where the one or more films will be used for the spectroscopic analysis.

3. The computer-implemented method of claim 2, wherein the plurality of types of chemicals that may be present where the one or more films will be used for the spectroscopic analysis includes two or more of weak acid, concentrated acid, aliphatic alcohol, concentrated alkalies, esters, ethers, aliphatic hydrocarbon, aromatic hydrocarbon, halogenated hydrocarbon, ketones, and oxidizing agents.

4. The computer-implemented method of claim 2, wherein the desired level of chemical resistance to the one or more of the plurality of types of chemicals that may be present where the one or more films will be used for the spectroscopic analysis includes one of a plurality of predetermined levels.

5. The computer-implemented method of claim 4, wherein the plurality of predetermined levels includes two or more of excellent, good, fair, not recommended, and unknown.

6. The computer-implemented method of claim 2, wherein the spectroscopic film selection tool is further configured, in response to the user input, to present a list of one or more films having the desired level of chemical resistance to one or more of the plurality of types of chemicals that may be present where the one or more films will be used for the spectroscopic analysis.

7. The computer-implemented method of claim 2, wherein the energy transmittance properties included in the store of the film data includes an energy transmittance curve plotting the energy transmittance for each of the plurality of films against one of a wavelength and an energy level of an emitted energy to be analyzed.

8. The computer-implemented method of claim 7, wherein the spectroscopic film selection tool is further configured to display the energy transmittance curve for one or more of the plurality of films at least one of:
  manually based on a manual user selection; and
  automatically based on the desired level of chemical resistance to the one or more of the plurality of types of chemicals that may be present where the one or more films will be used for the spectroscopic analysis.

9. The computer-implemented method of claim 1, wherein the spectroscopic film selection tool is further configured to identify the one or more of the plurality of films for use in the spectroscopic analysis with an associated identifier for a vendor from whom the one or more of the plurality of films may be purchased, wherein the identifier includes one or more of:
  a catalog number;
  the film type;
  the film thickness;
  a width of the film media; and
  a length of the film media.

10. The computer-implemented method of claim 1, further comprising, upon receiving a request to download the spectroscopic film selection tool, updating the store of film data included in the spectroscopic film selection tool at the first computing system before enabling the spectroscopic film selection tool be downloaded to the second computing system.

11. A non-transitory computer-readable medium storing machine-readable instructions to select one or more of a plurality of films for use in a spectroscopic analysis, the non-transitory computer-readable medium comprising:
  a spectroscopic film selection tool including:
    a set of machine-readable instructions configured to execute on a second computing system, wherein the machine-readable instructions are configured to elicit user input regarding attributes of a spectroscopic analysis and, based on the user input, identify one or more of a plurality of films for use in a spectroscopic analysis based on film data for each of the plurality of films; and
    a store of the film data for each of the plurality of films including data relating to suitability of each of the plurality of films including:
      a film type;
      a film thickness;
      a chemical resistance to one or more types of chemicals; and
      energy transmittance properties,
  whereby the set of machine-readable instructions and the store of film data are stored on a first computing system from which the set of machine-readable instructions and the store of film data are downloadable to the second the second computing system via a network.

12. The non-transitory computer-readable medium of claim 11, wherein the user input includes a desired level of chemical resistance to one or more of a plurality of types of chemicals that may be present where the one or more films will be used for the spectroscopic analysis including two or more of weak acid, concentrated acid, aliphatic alcohol, concentrated alkalies, esters, ethers, aliphatic hydrocarbon, aromatic hydrocarbon, halogenated hydrocarbon, ketones, and oxidizing agents.

13. The non-transitory computer-readable medium of claim 12, wherein the desired level of chemical resistance to the one or more of the plurality of types of chemicals that may be present where the one or more films will be used for the spectroscopic analysis includes one of a plurality of predetermined levels.

14. The non-transitory computer-readable medium of claim 12, wherein the plurality of predetermined levels includes two or more of excellent, good, fair, not recommended, and unknown.

15. The non-transitory computer-readable medium of claim 12, wherein the spectroscopic film selection tool is further configured, in response to the user input, to present a list of one or more films having the desired level of chemical resistance to one or more of the plurality of types of chemicals that may be present where the one or more films will be used for the spectroscopic analysis.

16. The non-transitory computer-readable medium of claim 11, wherein the energy transmittance properties included in the store of the film data includes an energy transmittance curve plotting the energy transmittance for each of the plurality of films against one of a wavelength and an energy level of an emitted energy to be analyzed.

17. The non-transitory computer-readable medium of claim 16, wherein the spectroscopic film selection tool is further configured to display the energy transmittance curve for one or more of the plurality of films one of:
  manually based on a manual user selection; and
  automatically based on the desired level of chemical resistance to the one or more of the plurality of types of chemicals that may be present where the one or more films will be used for the spectroscopic analysis.

18. The non-transitory computer-readable medium of claim 11, wherein the spectroscopic film selection tool is further configured to identify the one or more of the plurality of films for use in the spectroscopic analysis with an associated identifier for a vendor from whom the one or more of the plurality of films may be purchased.

19. The non-transitory computer-readable medium of claim 18, wherein the identifier includes at least one of:
  a catalog number;
  the film type;
  the film thickness;
  a width of the film media; and
  a length of the film media.

20. The non-transitory computer-readable medium of claim 11, further comprising, upon receiving a request to download the spectroscopic film selection tool, updating the store of film data included in the spectroscopic film selection tool at the first computing system before enabling the spectroscopic film selection tool be downloaded to the second computing system.

* * * * *